Inventor:
ALFRED BRUNNER
By K. A. Mayr
Attorney

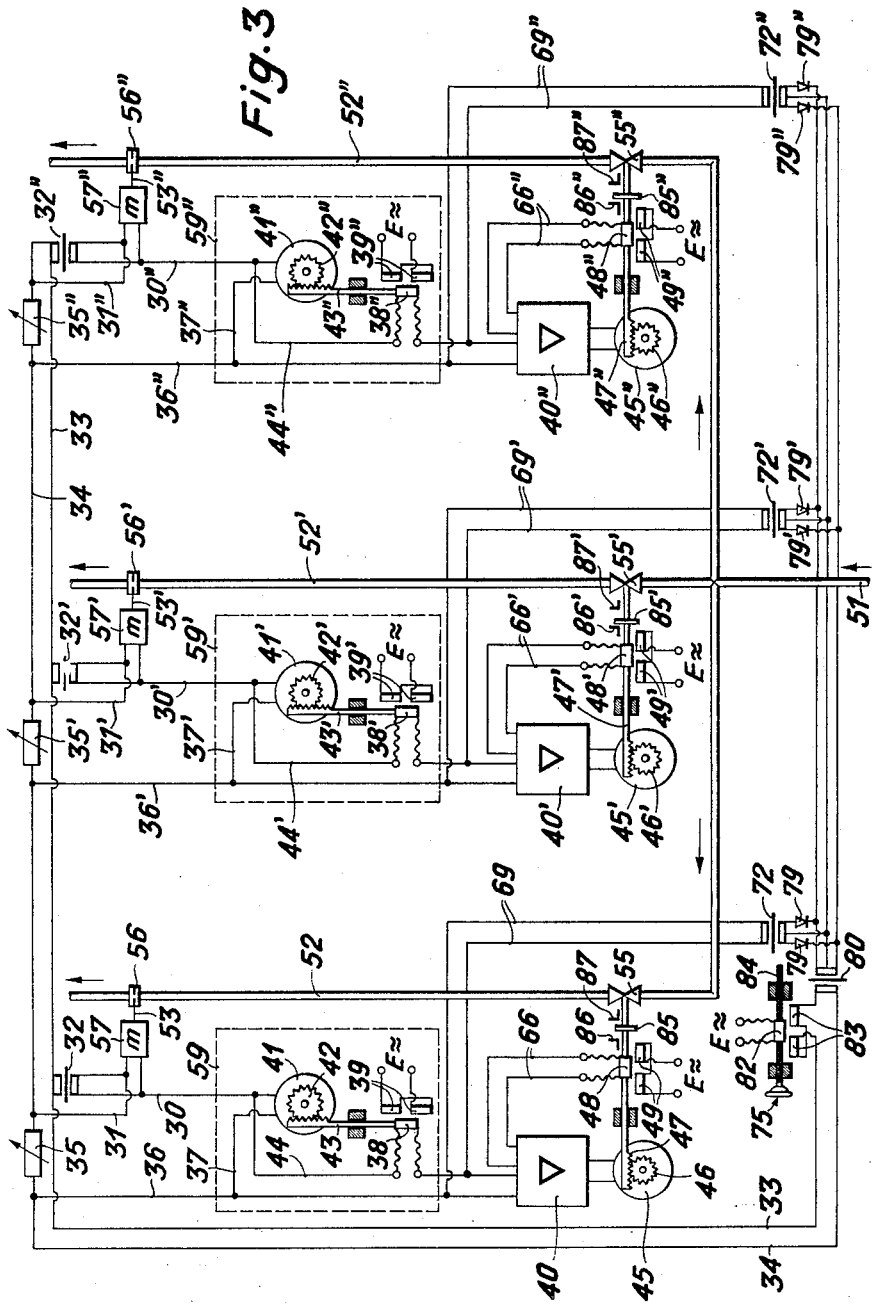

3,138,143
REGULATING SYSTEM FOR DIVIDING A STREAM OF FLUID INTO AT LEAST TWO SUBSIDIARY STREAMS
Alfred Brunner, Winterthur, Switzerland, assignor to Sulzer Freres, S.A., Winterthur, Switzerland, a corporation of Switzerland
Filed Feb. 13, 1961, Ser. No. 89,032
Claims priority, application Switzerland Feb. 19, 1960
3 Claims. (Cl. 122—406)

This invention relates to a regulating system for dividing a stream of fluid into at least two partial or subsidiary streams by means of throttling devices which control the flow in the partial streams.

It is an object of the invention to provide a system for splitting a stream of a fluid into at least two partial streams by controlling the rate of flow of each stream by means of valves or other rate of flow controlling means whereby at least one of the valves is always fully open in order to keep throttling losses as low as possible.

The division, i.e. the control of the means regulating the flow rate of the individual streams, may be effected in response to conditions prevailing in the particular application of the invention.

According to the invention a regulator is provided for each flow control means and a signal is fed to each regulator corresponding to a variable which must be controlled and which is dependent on the flow of the respective partial stream. At any time, the flow control means of at least one of the controlled partial streams is held fully open by the respective regulator so that it does not cause any appreciable resistance to the flow of the respective stream. The set point of each regulator is adjusted according to a desired portion of the sum of all signals corresponding to the controlled variables of the streams and according to the signal controlling the fully open flow rate control means.

The invention can be applied, for example, to the distribution of the total quantity of water delivered from a well among a plurality of consumers connected to the well, the regulating system embodying the invention ensuring that each consumer receives a specified portion of the total quantity even if an attempt is made to supply one of the consumers with more water than the consumer is supposed to receive, for example by lowering the pressure in the conduit which supplies this consumer.

When speaking of a "fully open" throttling element in this specification the flow area of the throttling element or valve may be somewhat smaller than the maximum flow area, i.e., the valve spindle may not be quite at the end of its travel so that it can move at least slightly in either direction. This is desirable because, if a disturbance occurs in the plant, the regulating oscillations of the system subside more rapidly than would be the case if the valve spindle were at the end of its travel and abutting against an abutment limiting the valve opening stroke of the spindle.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

FIG. 3 is a diagrammatic illustration of an electrically operated control system according to the invention whereby the relative rates of flow of the partial streams can be altered.

Figure 1:
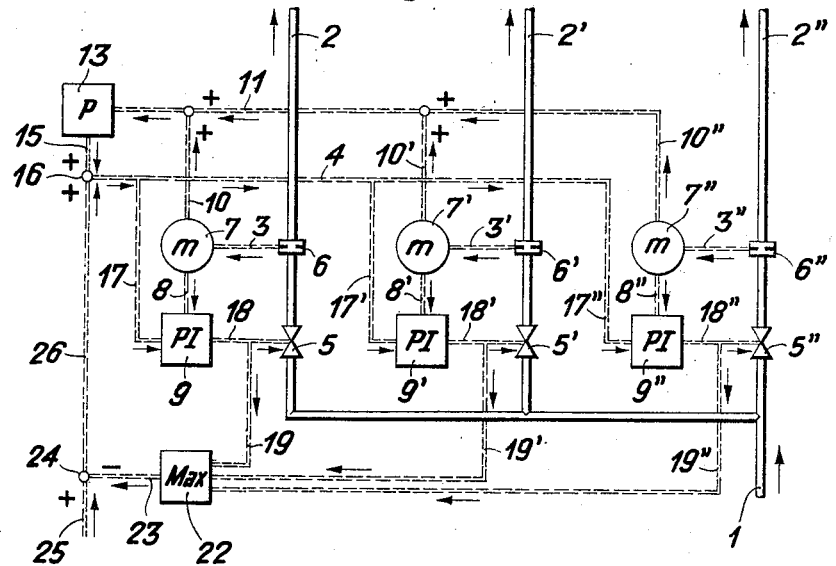
FIG. 1 is a diagrammatic illustration of a regulating system according to the invention which divides a stream of a medium into three partial or subsidiary streams whereby the flow rates of the partial streams are equal.

In the system shown in FIG. 1, a stream of a fluid medium, for example water from a well, is delivered through a conduit 1 which divides into three subsidiary conduits 2, 2' and 2". Each of the three subsidiary conduits contains a throttling device 5, 5' and 5", respectively, and a restrictor 6, 6' and 6", respectively, the latter being disposed downstream of the throttling devices. Each throttling device comprises a conventional motor operator which is not shown separately. The difference between the fluid pressures upstream and downstream of the restrictors 6, 6' and 6" is used to produce by conventional means 7, 7' and 7" a signal corresponding to the rate of flow of the medium in the conduits 2, 2' and 2", respectively. The signal-producing devices 7, 7' and 7" are connected to the respective restrictors by means of pipes which are indicated by dotted lines 3, 3' and 3", respectively. The signals produced by the devices 7, 7' and 7" are conducted through conduits 8, 8' and 8", respectively, to regulators 9, 9' and 9", respectively, which have a proportional-integral (PI) characteristic. The output signals of the regulators are transmitted by signal conduits 18, 18' and 18" to the motor operators forming part of the throttling devices 5, 5' and 5", respectively.

The signal-producing devices 7, 7' and 7" are connected by signal-transmitting conduits 10, 10' and 10", respectively, to a signal collector line 11. The latter is connected to a proportional averaging unit 13 in which a signal corresponding to the arithmetic mean value is formed of the signals delivered by the rate of flow signal-producing devices. The output signal of the averaging unit 13 is conducted by a conduit 15 to an addition point 16. A signal line 4 is connected to the addition point and branches into three set point signal lines 17, 17' and 17", which lead to the regulators 9, 9' and 9", respectively, for setting the set points thereof.

Signal conduits 19, 19' and 19" connect the signal conduits 18, 18' and 18", respectively, and a selector unit 22. The output side of the selector unit 22 is connected by a signal line 23 at a point 24 to a signal line 26 which terminates in the addition point 16 and receives a set point signal from a conduit 25.

The regulating system according to FIG. 1 adjusts the flow rates in each of the three subsidiary conduits 2, 2' and 2" in such manner that these flow rates are always equal even if the pressure in one of the subsidiary conduits is considerably reduced. Moreover, one of the throttling devices 5, 5' and 5" is always fully open. Assuming that the throttling device 5' is fully open and the pressure in the conduit 2 is lowered, for example, by opening a valve (not shown), the regulating system operates as follows: At first more medium flows through the restrictor 6 owing to the reduced pressure in the conduit 2. This produces an increased pressure drop across the restrictor which increases the signal produced in the flow rate signal-producing device 7. A signal which is increased by, say, three units is fed into the conduits 8 and 10. Assuming that correspondingly more medium is supplied through the conduit 1, the sum of the flow signals fed to the proportional averaging unit 13 also increases by three units. As a result of the mean value formation in the unit 13 the output signal of the latter is increased by one unit so that the lines 17, 17' and 17" feed to each of the three regulators 9, 9' and 9" a set point signal whose value is increased by one unit. The flow rate signal which is supplied through the conduit 8 to the regulator 9 and which has increased by three units is compared in the regulator 9 with the set point signal which has increased by one unit, and an adjusting signal reduced by two units is fed to the motor operator of the throttling device 5 which closes accordingly. It would now be necessary to increase the signals fed by the regulators 9' and 9" into the conduits 18' and 18" by one unit in accordance with the comparison of the signals in the conduits 8' and 8" which have remained substantially constant, with the set point signals in lines 17' and 17" which have increased by one unit. This increase of the adjusting signals by one unit would effect a corresponding increase of the flow areas of the throttling devices 5' and 5". Since, however, the throttling device 5' is already fully open and cannot open further, the increased adjusting signal in the conduit 18' acts through the conduit 19' on the selector unit 22 which accordingly feeds an increased signal through the line 23 to the point 24. Since this signal is greater than the set point signal fed in by the conduit 25, the signal in the line 26 is negative and reduces the set point signal in the line 4 until the signal in the line 23 corresponds to the set point signal in the conduit 25. This means that no change occurs at the throttling devices 5' and 5" and that the flow area of the throttling device 5 is further reduced.

Assuming, starting from the state of equilibrium, that the throttling device 5 is fully open and that the pressure in the subsidiary conduit 2 is reduced, a larger signal sum is fed to the proportional averaging unit 13 as a result of the greater rate of flow signal in the conduit 10 and a greater set point signal corresponding to the new mean value is fed through the lines 17, 17' and 17" to the regulators 9, 9' and 9". The flow area of the throttling device 5 is reduced accordingly and the flow areas of the throttling devices 5' and 5" are increased. In this case, as a result of the reduced signal in the conduit 19, there is a difference between the signal in the line 23 and the set point signal in the conduit 25, causing an increase of the signal in the line 26, if the adjusting signals in the lines 18' and 18" remain smaller than the reduced adjusting signal in the line 18. Therefore, the set point signal originating at the addition point 16 is increased and fed into the lines 4, 17, 17' and 17" until the signal in the line 23 and the set point signal in the line 25 are again equal. The increased set point signals in the lines 17, 17' and 17" cause complete opening of the throttling device 5 while the throttling devices 5' and 5" open until the rates of flow in the conduits 2, 2' and 2" are again equal.

The aforedescribed regulating system assures that the rates of flow in all subsidiary conduits are equal and one of the throttling devices is always fully open, irrespective of a pressure reduction in any of the conduits and which of the throttling devices is fully open.

Figure 2:
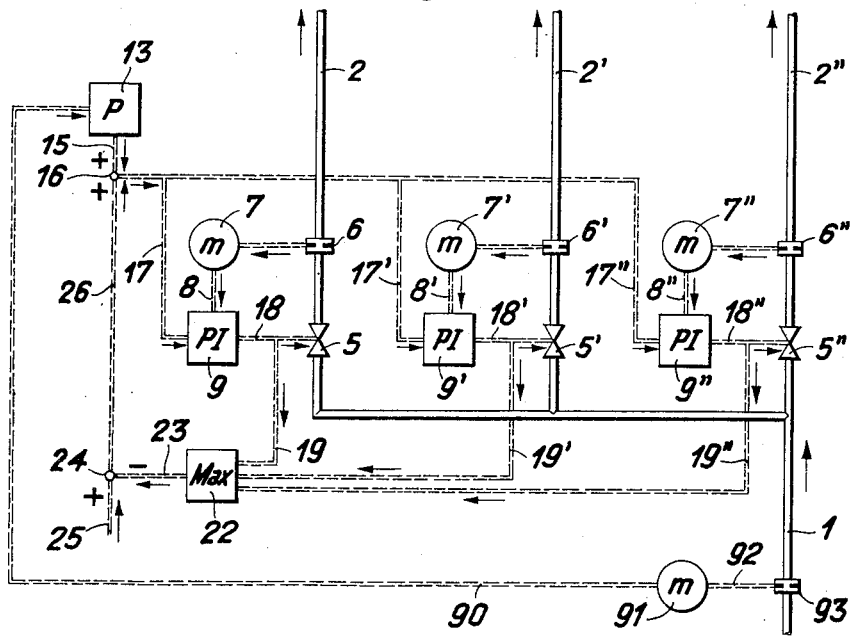
FIG. 2 is a diagrammatic illustration of a modification of the regulating system shown in FIG. 1.

In the modified regulating system shown in FIG. 2 a signal conduit 90 is provided between a signal producer 91 connected by pressure lines 92 to a restrictor 93 in the conduit 1 which producer is responsive to the rate of flow in the conduit 1. In this case the flow rate in the conduit 1 is measured and fed to the proportional unit 13 for producing a mean value signal. The mode of operation of the regulating system is the same in principle as that of the system shown in FIG. 1. Assuming that the pressure in the subsidiary conduit 2 is reduced and the throttling device 5' is fully open and the rate of flow in the conduit 1 remains unchanged, the following regulating cycle takes place: The increased flow in the subsidiary conduit 2 causes the rate of flow signal-producing device 7 to feed a signal to the regulator 9 which signal is increased by, for example, two units. At the same time, less medium flows through the subsidiary conduits 2' and 2" so that the flow rate signal-producing devices 7' and 7" feed signals to the regulators 9' and 9", each of which signals may be assumed to be smaller by one unit. In accordance with the altered flow rate signals the flow area of the throttling device 5 is reduced by two units, while the flow area of each of the throttling devices 5' and 5" would have to be increased by one unit. Since the throttling device 5' is already fully open, the request made by the regulators 9' and 9" cannot be complied with. The increased adjusting signal in the conduit 18' is fed through the conduit 19' to the selector unit 22 which accordingly feeds a signal to the line 23, which signal is greater than the set point signal in the conduit 25. A negative signal is therefore transmitted through the line 26 resulting in a reduction of the set point signals in the lines 17, 17' and 17". The reduced set point signal in the line 17 alters the effect of the regulator 9 on the adjusting signal in the conduit 18 in such manner that the throttling device 5 continues to close. The adjusting signals in the conduits 18' and 18" resume their original values as a result of the reduced set point signals in the lines 17' and 17", so that the throttling devices 5' and 5" retain the original flow area and the flow rates in the three subsidiary conduits are again equal.

FIG. 3 illustrates an implementation by electrical devices of a regulating system similar to that diagrammatically shown in FIG. 1. A difference between the systems shown in FIGS. 1 and 3 is that in the latter the rates of flow of the subsidiary streams may differ from one another and the ratio between the different flow rates is maintained. A supply conduit 51 branches into three subsidiary conduits 52, 52' and 52", each containing a throttle valve 55, 55' and 55", respectively. Each subsidiary conduit also contains a restrictor 56, 56' and 56", connected by signal lines 53, 53' and 53", respectively, to an electrical rate of flow signal producer 57, 57' and 57", respectively. From each rate of flow signal producer a conductor 30, 30' and 30", respectively, leads to a proportional-integral regulator, henceforth called a PI regulator, 59, 59' and 59", respectively, and a conductor 31, 31' and 31", respectively, leads to a terminal of a potentiometer 35, 35', and 35", respectively. The primary winding of a transformer 32, 32' and 32", respectively, is connected to each pair of conductors 30, 31, 30', 31' and 30", 31". The secondary windings of the three transformers are interposed in series relation in a conductor 33, and the three potentiometers 35, 35' and 35" are interposed in series relation in a conductor 34. A conductor 36, 36' and 36", respectively, leads from the second terminal of each potentiometer to the PI regulators 59, 59' and 59", respectively. With the aforedescribed arrangement voltages individually proportional to the rates of flow in the subsidiary conduits are individually compared with the voltages at the associated potentiometers which correspond to the desired rates of flow and a voltage corresponding to the difference between the two aforesaid voltages is fed as an input voltage by the conductors 36, 30, 36', 30' and 36", 30", respectively, to the associated regulators 59, 59' and 59". For the sake of simplicity, only the regulator 59 will be described in detail. The regulators 59' and 59" are like the regulator 59.

The regulator 59 is conventional. The conductor 30 and a conductor 37 branching off from the conductor 36 are connected in the usual manner to the driver coil of a Ferraris induction motor 41 whose driving pinion 42 rotates at a speed corresponding to the input voltage. The pinion 42 adjusts the position of a movable coil 38 of an inductive sender by way of a rack 43, the stationary coils 39 of the sender being connected to a source of a reference alternating current voltage E. The coil 38 is interposed in a conductor 44 branching off from the conductor 30, the voltage induced in the coil 38 being dependent on the position of the coil and hence on the period of time during which a voltage acts on the driver coil of the motor 41. The voltage of the coil 38 provides the time integral of the input voltage at the driver coil and is superimposed on the input voltage acting on the conductors 36 and 44 and forming the proportional component. The output voltage of the regulator at the conductors 36 and 44 resulting from this transformation and forming an adjusting signal for the throttling element 55 is fed to an amplifier 40 whose output voltage is fed to the driver coil of a servomotor 45 which is constructed on the same principle as the induction motor 41. The pinion 46 of the servomotor 45 drives a rack 47 which adjusts the flow area of the valve 55. The rack 47 also carries the movable coil 48 of an inductive sender whose fixed coils 49 are connected to a source of reference alternating current voltage E. Depending on the position of the rack 47 and, therefore, of the coil 48 a voltage is induced in the latter and fed by a pair of conductors 66 to the input side of the amplifier 40 in opposition to the output voltage of the regulator 59 and has a feedback effect. The rod of the rack 47 has a collar 85 movable between two stops 86 and 87 which define the maximum and minimum flow area of the valve 55.

On the output side of the regulator 59 a pair of conductors 69 is connected to the conductors 36 and 44 and leads to the primary winding of a transformer 72, which is part of a selector unit which passes only the highest output signal of the three regulators 59, 59' and 59''. To this end the secondary winding of the transformer 72 is connected by diodes 79 or other rectifiers to the primary winding of a transformer 80, to which the secondary windings of the transformers 72' and 72'' are also connected in parallel, with the interposition of rectifiers 79' and 79'', respectively; the center tappings of the coils of the secondary windings of the transformers 72, 72' and 72'' are without a rectifier. The secondary winding of the transformer 80 is connected on the one hand to the conductor 34 and on the other hand, through two stationary coils 83 of an inductive set point signal producer 75, to the conductor 33. The movable coil 82 of the set point signal producer 75 is connected to the reference alternating current voltage E and is mounted on a manually operated spindle 84 for movement relative to the coils 83 and for altering the voltage between the conductors 33 and 34; the voltage induced in the coils 83 represents the desired value for the maximum voltage passed by the rectifiers 79, 79' and 79'' from the secondary windings of the transformers 72, 72' and 72'', respectively, and, therefore, also the desired value for the maximum flow areas of the valves 55, 55' and 55''. The spindle 84 is generally operated only when setting up the plant. If only a limited quantity of medium can be supplied through the conduit 1, for example, to protect a well from drying up, adjustment of the spindle 84 may be necessary for reducing the voltage induced in the coils 83 to reduce the maximum flow areas of the valves 55, 55' and 55''.

It is assumed that the ratio between the rates of flow of the fluid through the subsidiary conduits 52, 52' and 52'' is 1:2:3. This ratio is set at the potentiometers 35, 35' and 35''. Of course, any other desired ratio can be obtained by suitable adjustment of the potentiometers.

If, as shown in FIG. 3, the valve 55' is fully open and the pressure in the subsidiary conduit 52 is reduced, the rate of flow signal producer 57 delivers an increased voltage signal corresponding to the increased rate of flow through the conduit 52. This causes an increase of the input voltage of the regular 59 which voltage represents the deviation of the actual rate of flow from the desired rate of flow. Therefore, the regulator 59 feeds a reduced adjusting signal to the amplifier 40 and the servomotor 45 moves the rack 47 to the right for reducing the flow area of the valve 55. The displacement of the rack 47 continues until the voltage induced in the coil 48 and fed back to the amplifier 40 through conductors 66 in opposition to the output voltage of the regulator 59 is equal to this output voltage. The increased output voltage of the device 57 acts at the same time through the conductor 33 as a disturbance upon the components of the regulating system pertaining to the other two subsidiary conduits 52' and 52''. Since this disturbance changes the desired ratio of the subsidiary flow rates, the input voltages of the regulators 59' and 59'' effect an increase of the output voltages of the regulators and an operation of the motors 45' and 45'' which would cause an increase of the flow areas of the valves 55' and 55''. Since, however, the valve 55' is already fully open, as will be seen from the position of the collar 85' at the left stop 86', the servomotor 45' cannot increase the flow area of the valve 55'. The increased output signal of the regulator 59' is fed through the conductors 69' to the transformer 72' and thence to the transformer 80, with the result that the voltage in the circuit formed by the conductors 33 and 34, the potentiometers 35, 35' and 35'', the secondary windings of the transformers 32, 32' and 32'', the fixed coils 83 of the set point signal producer 75 and the secondary coil of the transformer 80 is varied in such manner that the flow area of the valve 55 is further reduced by the regulator 59 until the ratio of the rates of the subsidiary flows as set at the potentiometers 35, 35' and 35'' is restored.

We consider now the operation of the control system when the valve 55 is fully open and the ratio of the rates of flow in the subsidiary conduits is altered so that the flow rate in the subsidiary conduit 52 is increased. To achieve this, the potentiometer 35 is set at a greater resistance whereby the input voltage to the regulator 59 is increased and at the same time the input voltage to the regulators 59' and 59'' is reduced, because the potentiometer 35 now receives a larger portion of the total voltage which has remained constant. Owing to the higher input voltage of the regulator 59, its output voltage also becomes higher, tending to increase the flow area of the valve 55 by means of the servomotor 45. This is not possible, however, since the valve already is fully open and the collar 85 abuts the stop 86. Meanwhile, the flow areas of the valves 55' and 55'' are reduced as a result of the smaller input voltages, causing smaller output voltages of the respective regulators 59' and 59''. The higher output voltage of the regulator 59 is fed to the transformer 72 through the conductors 69, inducing a voltage in the secondary windings of the transformer 80 which voltage opposes the voltage induced in the secondary windings of the transformers 32, 32' and 32'' so that the input voltages of the three regulators are reduced, the input voltage to the regulator 59 being reduced in such manner that its new output voltage corresponds to the full open position of the valve 55 while the lower input voltages to the regulators 59' and 59'' effect further reduction of the flow areas of the valves 55' and 55'' until the rates of flow through the subsidiary conduits 52, 52' and 52'' correspond to the new ratio set at the potentiometers.

If the valve 55' is fully open and the resistance at the potentiometer 35 is increased so that the rate of flow through the subsidiary conduit 52 increases, the system operates as follows: The input voltage to the regulator 59 is increased while the input voltages to the regulators 59' and 59'' are reduced, as in the previous case. Accordingly, the output voltage of the regulator 59 increases and the output voltages of the regulators 59' and 59'' decrease. Consequently, the valve 55 opens while the valves 55' and 55'' begin to close. The smaller output voltage of the regulator 59' produces a smaller voltage across the conductors 69' so that a voltage is induced in the secondary winding of the transformer 80 which voltage acts in the same sense as the voltage induced in the secondary windings of the transformers 32, 32' and 32''. This increases the input voltage, and hence also the output voltage, of the regulator 59, causing accelerated opening of the valve 55 while the higher input and output voltages of the regulators 59' and 59'' delay the closing movement of the associated valves 55' and 55'', respectively. In the meantime, the voltage across the conductors 69 becomes greater than that across the conductors 69', so that the voltage induced in the secondary winding of the transformer 80 is reduced and finally disappears when the valve 55 is fully open.

Instead of the continuous regulators used in the described examples, it is possible to use discontinuous regulators or combinations of continuous and discontinuous regulators.

What is claimed is:

1. A regulating system for dividing a stream of a medium into at least two partial streams comprising a flow rate controlling means interposed in each stream, one of said flow rate controlling means being fully open at any time, a rate of flow responsive means interposed in each stream, a control signal producer connected to each of said rate of flow responsive means for producing a control signal corresponding to the respective flow rate, a regulator connected to each of said control signal producers for receiving control signals therefrom and operatively connected to the flow rate controlling means pertaining to the same stream as the respective control signal producer for actuating the respective flow rate controlling means according to actuating signals issuing from the respective regulator, a signal averaging device connected to said control signal producers for producing a signal corresponding to the arithmetic mean value of said control signals, selector means operatively connected to said regulators for receiving signals therefrom corresponding to said actuating signals and selecting the signal corresponding to the actuating signal of the fully open flow rate controlling means, signal combining means for combining the selected signal with the signal produced by said signal averaging device, and means for feeding the combined signal as set point signal into said regulators for actuating said flow rate controlling means to maintain predetermined relative flow rates in all partial streams and for holding at least one of the flow rate controlling means in fully open position.

2. A regulating system as defined in claim 1 including means interposed between said selector means and said signal combining means for comparing said selected signal with a set point signal corresponding to the maximum desired opening of the flow rate controlling means for feeding a signal corresponding to the difference between said selected signal and said set point signal to said signal combining means.

3. A regulating system according to claim 2 including a control signal adjusting means operatively interposed between each of said control signal producers and the respective regulator for adjusting the control signals fed into the regulators to obtain desired relative rates of flow in the partial streams.

References Cited in the file of this patent

UNITED STATES PATENTS 2,800,887    Profos _____ July 30, 1957

FOREIGN PATENTS 1,055,167    Germany _____ Apr. 16, 1959
1,221,280    France _____ Jan. 11, 1960